US011479210B2

(12) United States Patent
Yamamoto et al.

(10) Patent No.: US 11,479,210 B2
(45) Date of Patent: Oct. 25, 2022

(54) CAB FOR CONSTRUCTION MACHINE

(71) Applicant: KOBELCO CONSTRUCTION MACHINERY CO., LTD., Hiroshima (JP)

(72) Inventors: Keiji Yamamoto, Hiroshima (JP); Takuzo Shimoi, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 218 days.

(21) Appl. No.: 16/990,314

(22) Filed: Aug. 11, 2020

(65) Prior Publication Data

US 2021/0094513 A1    Apr. 1, 2021

(30) Foreign Application Priority Data

Sep. 26, 2019   (JP) .............................. JP2019-175799

(51) Int. Cl.
*B60S 1/04* (2006.01)
*B60S 1/08* (2006.01)
(Continued)

(52) U.S. Cl.
CPC ........... *B60S 1/0433* (2013.01); *B60S 1/0452* (2013.01); *B60S 1/08* (2013.01); *B60S 1/18* (2013.01);
(Continued)

(58) Field of Classification Search
CPC ...... B60S 1/0402; B60S 1/0413; B60S 1/043; B60S 1/0433; B60S 1/0422; B60S 1/0425;
(Continued)

(56) References Cited

U.S. PATENT DOCUMENTS

| 8,020,247 B2 * | 9/2011 | Katou ................... B62D 35/007 15/250.31 |
| 9,027,986 B2 * | 5/2015 | Karami ................... E02F 9/163 296/190.03 |

(Continued)

FOREIGN PATENT DOCUMENTS

| JP | 2000-062574 A | 2/2000 |
| JP | 2003-170812 A | 6/2003 |

(Continued)

OTHER PUBLICATIONS

Extended European Search Report dated Jan. 21, 2021 in corresponding European Patent Application No. 20191092.4, 5 pages.

*Primary Examiner* — Gary K. Graham
(74) *Attorney, Agent, or Firm* — Oblon, McClelland, Maier & Neustadt, L.L.P.

(57) ABSTRACT

Provided is a compact and high-strength cab capable of securing an excellent field of view for work. The cab includes a guard protecting a cab body, and a wiper having a blade to wipe a front window member and a blade actuator for actuating the blade. The guard includes a pair of side pillars and an actuator housing beam interconnecting the side pillars and housing the blade actuator. The actuator housing beam includes a hollow beam body formed with a body opening and a front-rear partition plate partitioning the inside of the beam body into front and rear sections. The body opening allows the blade actuator to be assembled to the front-rear partition plate therethrough.

9 Claims, 8 Drawing Sheets

(51) Int. Cl.
  *B60S 1/18* (2006.01)
  *E02F 9/16* (2006.01)
  *B60S 1/34* (2006.01)
  *B60R 21/13* (2006.01)
  *B60R 21/00* (2006.01)
  *B62D 33/06* (2006.01)

(52) U.S. Cl.
  CPC ............ *B60S 1/3409* (2013.01); *E02F 9/163* (2013.01); *B60R 21/131* (2013.01); *B60R 2021/0081* (2013.01); *B60S 1/0422* (2013.01); *B62D 33/06* (2013.01)

(58) Field of Classification Search
  CPC .... B60S 1/0427; B60S 1/0438; B60S 1/0488; B60S 1/0461; B60S 1/0458; B60S 1/0452; B60S 1/08; B60S 1/3404; B60S 1/3409; B60S 1/3406; E02F 9/16; E02F 9/163; B60R 21/131; B60R 2021/0081; B60R 2021/0076; B62D 65/16
  USPC ................ 15/250.3, 250.23, 250.16, 250.19; 296/187.13, 190.01, 190.03, 190.08, 296/190.1, 200, 84.1, 96.15, 96.17
  See application file for complete search history.

(56) References Cited

U.S. PATENT DOCUMENTS

| | | | |
|---|---|---|---|
| 10,583,866 B2* | 3/2020 | Kobayashi | ................ B60S 1/28 |
| 2002/0135207 A1* | 9/2002 | Sakyo | .................. B60R 21/131 |
| | | | 296/190.08 |
| 2007/0200389 A1* | 8/2007 | Ina | ...................... B62D 35/007 |
| | | | 296/180.1 |
| 2012/0138090 A1 | 6/2012 | Bichler | |
| 2017/0183017 A1 | 6/2017 | Hirata et al. | |

FOREIGN PATENT DOCUMENTS

| | | |
|---|---|---|
| JP | 2004-345486 A | 12/2004 |
| JP | 2007-063839 A | 3/2007 |
| WO | WO 2011/019305 A1 | 2/2011 |

\* cited by examiner

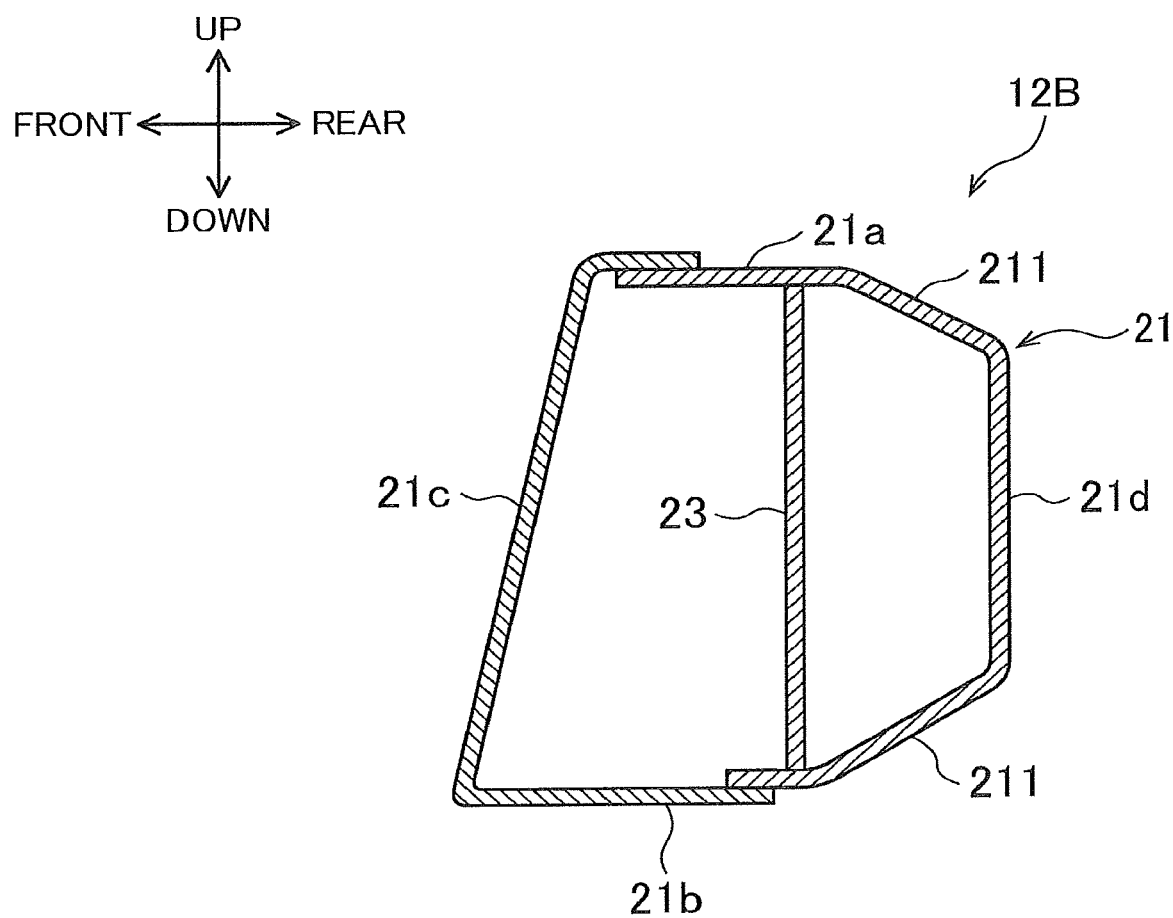

CAB FOR CONSTRUCTION MACHINE

TECHNICAL FIELD

The disclosed technique relates to a cab for a construction machine such as a hydraulic excavator.

BACKGROUND ART

A general cab provided in a construction machine is a box-shaped structure, separating the inside thereof that defines an operator's compartment from the outside. The cab includes a plurality of windows for allowing the surroundings to be visually recognized. The plurality of windows include a front window located in a front portion of the cab. The front window generally has a larger area than that of the other windows to secure an excellent field of view for an operator.

For the cabs of construction machines, provided are standards relating to structures for protecting the operator in the event of a rollover (ROPS standards). Each of Patent Literature 1 (Japanese Unexamined Patent Publication No. 2004-345486) and Patent Literature 2 (Japanese Unexamined Patent Publication No. 2007-63839) discloses a cab including a cab body and a guard attached to the periphery of the cab body to reinforce it, the guard conforming to the ROPS standards.

Besides, a cab for a construction machine is equipped with a wiper for work in rainy weather. As disclosed in Patent Literature 3 (Japanese Unexamined Patent Publication No. 2000-62574) and Patent Literature 4 (Japanese Unexamined Patent Publication No. 2003-170812), the wiper includes a blade to wipe off water droplets on the outer surface of a front window member provided to the front member and made of, for example, glass.

The blade of the wiper disclosed in Patent Literature 3, configured to swing about a drive shaft disposed on one of side edges of the front face of the cab to move in an arc, is able to clean the front window member only in a small area compared to the whole area of the front window member, having difficulty securing an excellent field of view for work.

The wiper disclosed in Patent Literature 4, being a so-called parallel wiper including parallel links to make blades move in parallel to each other, is capable of cleaning a large area of the front window member, while having a possibility of significantly increasing the overall size of a cab to which the wiper disclosed in Patent Literature 4 is applied, especially when the cab includes a guard conforming to the ROPS standards.

Although Patent Literature 4 discloses disposing a motor for driving the wiper between a cab body and a guard for protecting the cab body from collision with rubble or other debris, the addition of the wiper causes only a little increase in the overall size of the cab, because the guard disclosed in Patent Literature 4 is designed for preventing the collision with rubble or other debris and therefore requires no heavy and thick structure to secure high strength. However, if the guard disclosed in Patent Literature 4 is replaced with a guard conforming to the ROPS standards, i.e. a guard having a large-sized and large-scale structure made of, for example, steel pipes with large diameters, to secure strength sufficient to protect the cab body in the event of its rollover, the combination of the guard and the wiper will significantly increase the overall size of the cab. Specifically, securing a space between such a heavy and thick guard and the cab body for installation of the motor of the wiper involves a large projection of the guard beyond the cab, which significantly increases the overall size of the cab and also affects the field of view for work.

SUMMARY OF INVENTION

An object of the disclosed technique is to provide a cab for a construction machine, the cab being capable of effectively protecting a cab body and securing an excellent field of view for work with a compact structure.

Provided is a cab for a construction machine, comprising: a cab body defining an operator's compartment and including a front window member facing forward; a guard for protecting the cab body; and a wiper configured to wipe off water droplets on an outer surface of the front window member. The wiper includes a pair of link arms having respective proximal ends, a blade supported by the pair of link arms so as to make tight contact with an outer surface of the front window member, and a blade actuator configured to swing the pair of link arms about axes passing through the respective proximal ends of the pair of link arms in a front-rear direction to thereby reciprocate the blade along the outer surface of the front window member. The blade actuator includes a link arm support unit that supports the respective proximal ends of the pair of link arms so as to allow the pair of link arms to swing, a blade drive motor for generating power, and a drive transmission mechanism configured to transmit the power generated by the blade drive motor to the pair of link arms to swing the pair of link arms. The guard includes a pair of side pillars extending along opposite edges of the cab body in a width direction of the cab body, respectively, and at least one beam disposed between the pair of side pillars to interconnect the pair of side pillars in the width direction. The at least one beam includes an actuator housing beam that houses the blade actuator. The actuator housing beam includes a hollow beam body extending in the width direction along an upper front portion of the cab body, and a front-rear partition plate partitioning a beam interior space, which is an internal space of the beam body, into front and rear sections. The beam body is formed with a body opening that provides communication between an inside and an outside of the beam body, the body opening allowing the blade actuator to be assembled to the front-rear partition plate through the body opening and allowing the pair of link arms to extend from the blade actuator to the outside of the actuator housing beam through the body opening to support the blade.

BRIEF DESCRIPTION OF DRAWINGS

FIG. 5 is a sectional side view taken along the arrows V-V in FIG. 4.

DESCRIPTION OF EMBODIMENTS

Figure 1:
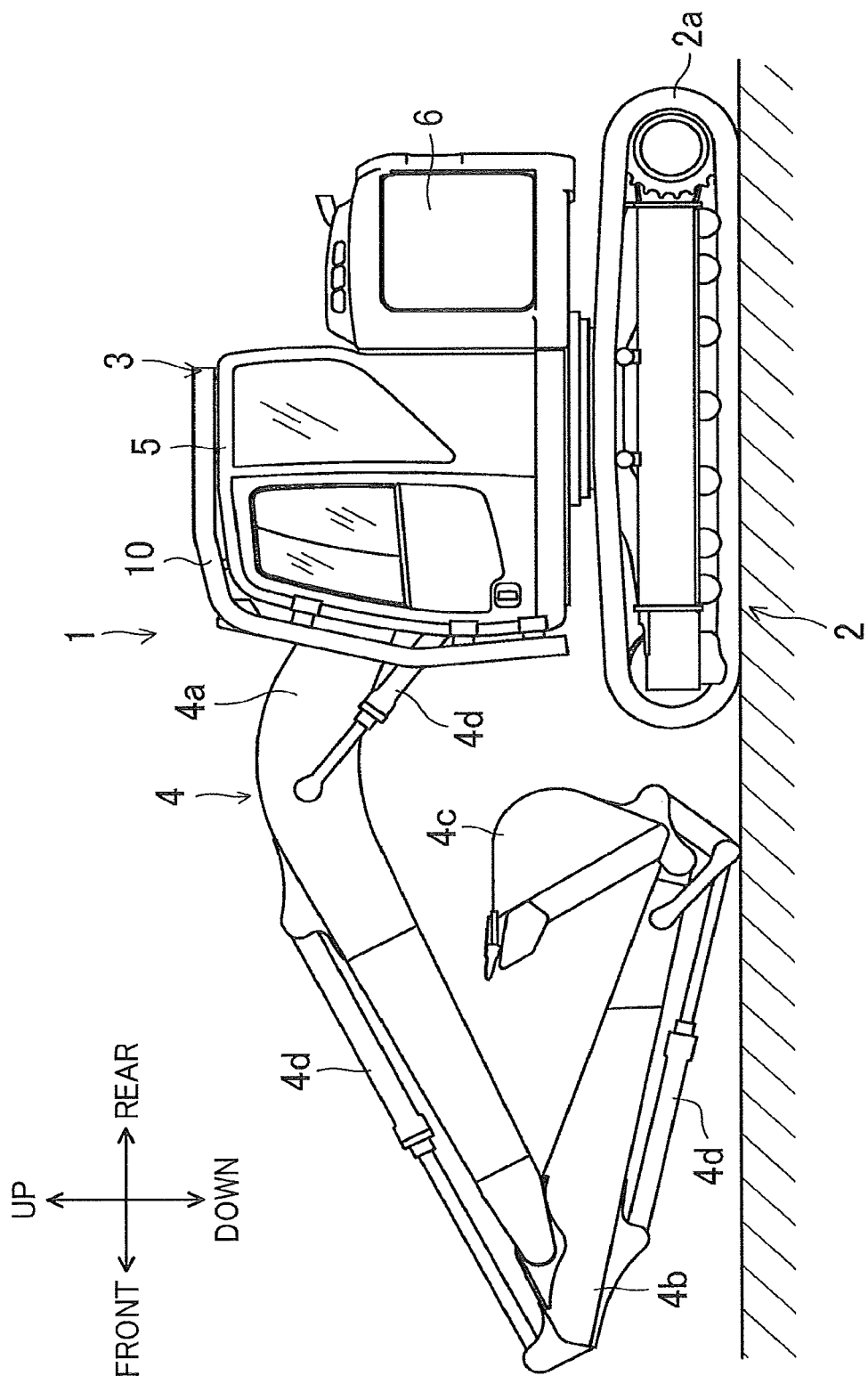
FIG. 1 is a side view of a hydraulic excavator equipped with a cab according to the disclosed technique.

Hereinafter, an embodiment of the disclosed technique will be described in detail with reference to the accompanying drawings. It should be understood that the following description is merely illustrative in nature and is not intended to limit the application and use of the present invention in any way. The directions used in the description, such as front and rear, up and down, and right and left, are indicated by the arrows in the drawings.

FIG. 1 shows a hydraulic excavator 1 serving as a construction machine according to the embodiment. The hydraulic excavator 1 includes a lower travelling body 2 and an upper slewing body 3 slewably mounted on the lower travelling body 2. The lower travelling body 2 incudes a pair of crawler tracks 2a, 2a arranged laterally of the lower travelling body 2. The crawler tracks 2a, 2a are driven to make the hydraulic excavator 1 travel.

The upper slewing body 3 includes an attachment 4, a cab 5, and a machine room 6. The attachment 4 includes a boom 4a, an arm 4b, a bucket 4c, and a plurality of hydraulic cylinders 4d that actuates the boom 4a, the arm 4b, and the bucket 4c, respectively, making an action for work such as excavation. The machine room 6 accommodates an engine for driving the attachment 4, a hydraulic pump, and other components.

Figure 2:
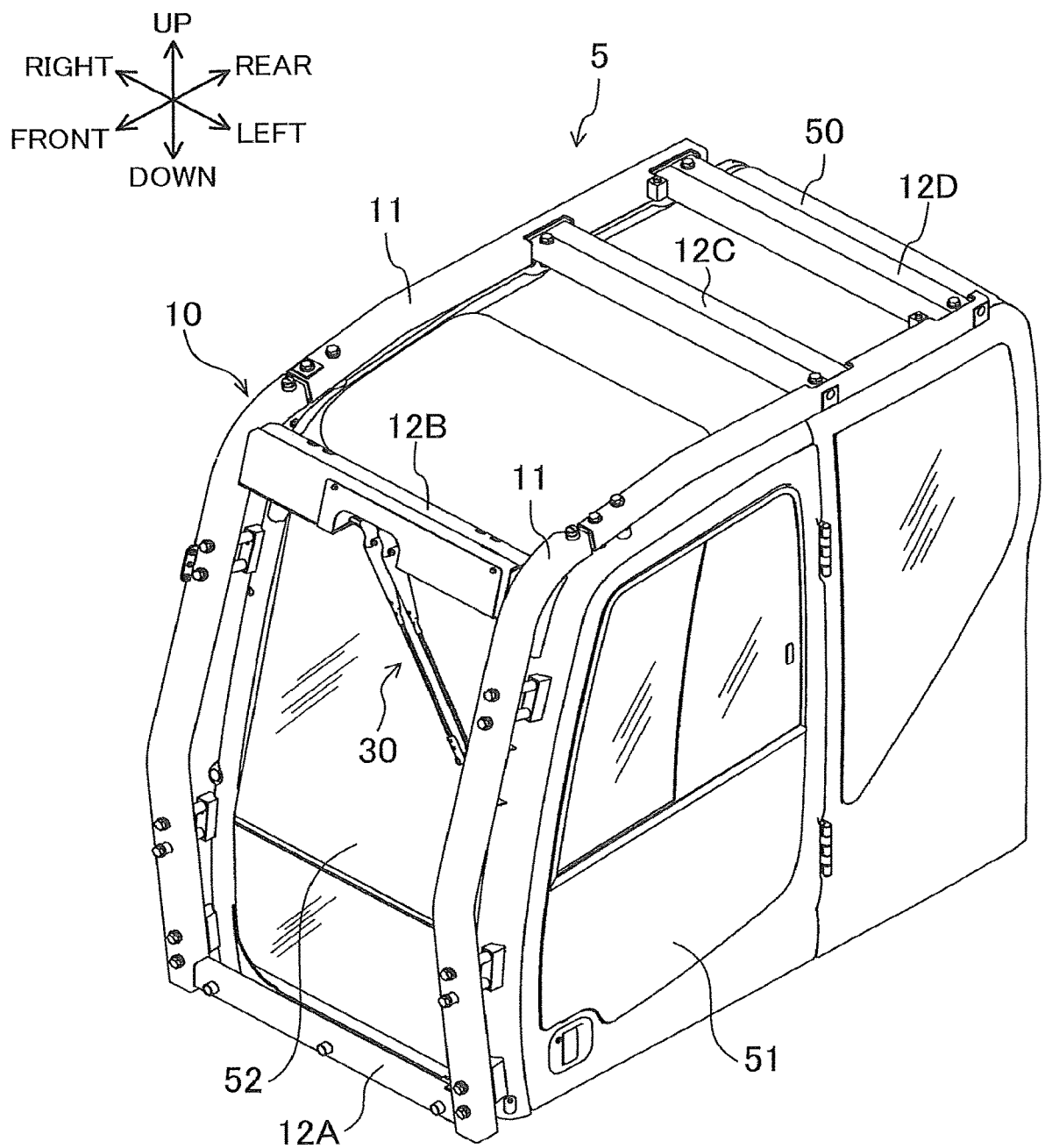
FIG. 2 is a perspective view of the cab.

The cab 5 includes, as shown in FIG. 2, a cab body 50 defining a box-shaped operator's compartment, a guard 10, and a wiper 30.

In the present embodiment, the cab 5 is disposed on the left side of the attachment 4. The guard 10 is disposed outside the cab body 50 and configured to be capable of protecting an operator in the operator's compartment even in the event of a rollover of the hydraulic excavator 1. Specifically, the cab 5 according to the present embodiment has a high-strength structure conforming to the ROPS (rollover protection structure) standards.

The cab body 50 mainly includes a panel and a frame. As shown in FIG. 2, the cab body 50 includes right and left walls, a front wall, a rear wall, and a top wall, being formed with a plurality of windows at respective appropriate positions in the walls. The left wall is formed with an entrance, which allows the operator to get into the operator's compartment through the entrance. The cab body 50 includes a door 51 swingable to open and close the entrance. Each of the windows enables the operator to visually recognize the surroundings of the cab 5 through the window. The window formed in the front wall of the cab body 50, namely, a front window, occupies a large area enough to secure an excellent field of view for work. The cab body 50 includes a front window member 52 disposed to cover the front window and to face forward.

Figure 3:
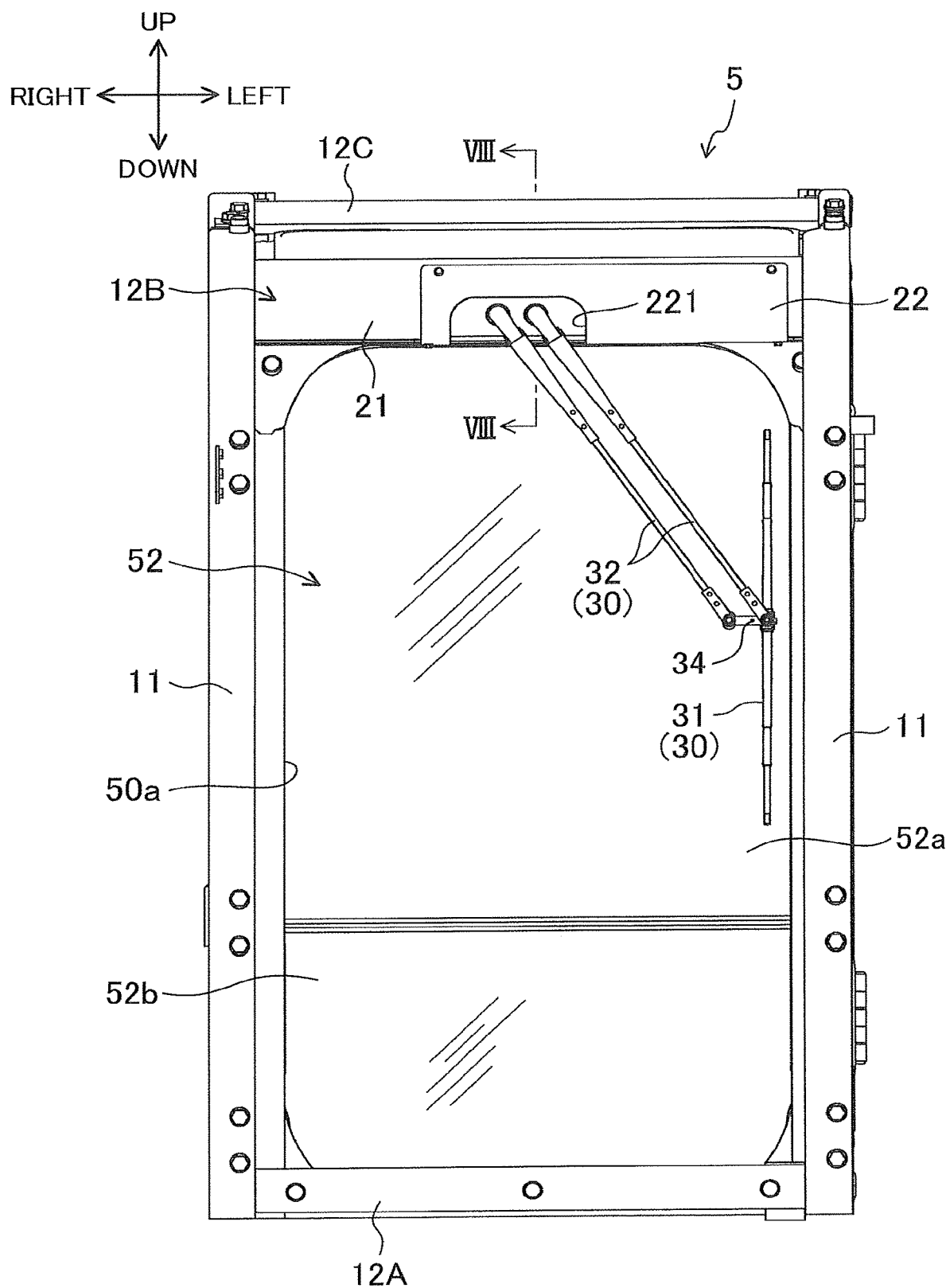
FIG. 3 is a front view of the cab.

As shown in FIG. 3, the front wall is formed with a window frame 50a having a rectangular shape extending along the upper, lower, right and left edges of the front wall, and the front window member 52 is disposed inside the window frame 50a. In the present embodiment, the front window member 52 constitutes most part of the front wall of the cab 5. The front window member 52 is made of a transparent material, such as a tempered glass. The front window member 52 according to the present embodiment includes an upper window member 52a and a lower window member 52b.

The wiper 30 is configured to wipe off rainwater on the outer surface of the front window member 52 during work in rainy weather to thereby allow an excellent field of view for the work to be secured. The wiper 30 is a so-called parallel wiper capable of wiping off the rainwater over a large area. In the cab 5 according to the present embodiment, the wiper 30 that is a parallel wiper as mentioned above is assembled to a member constituting the guard 10 with a compact structure and in a state of allowing an excellent field of view for work to be secured, as described below.

As shown in FIGS. 2 and 3, the guard 10 includes a pair of side pillars 11, 11 and a plurality of beams provided between the pair of side pillars 11, 11. The plurality of beams include a first beam 12A, a second beam 12B, a third beam 12C, and a fourth beam 12D.

Each of the pair of side pillars 11, 11 is formed of a pipe or rod with high strength, preferably, a steel pipe having a great thickness and a large transverse cross section. The pair of side pillars 11, 11 extend along the opposite edges of the cab body 50 with respect to the width direction thereof, namely, the right and left edges of the cab body 50, respectively. Specifically, each of the pair of side pillars 11, 11 has an upper pillar portion and a front pillar portion. The upper pillar portions extend horizontally along respective upper edges of the right and left walls of the cab body 50, respectively. The front pillar portions extend substantially downward from respective front ends of the upper pillar portions along respective front edges of the right and left walls, respectively.

Each of the side pillars 11, 11 is fixed to the cab body 50 at a plurality of positions. Specifically, the upper pillar portion of each side pillar 11 is fixed to the cab body 50 with contact of a substantially entire part of the upper pillar portion with the top wall of the cab body 50, whereas the front pillar portion of each side pillar 11 is spaced forward from the cab body 50 with a small gap.

Each of the first to fourth beams 12A to 12D extends in the width direction of the cab body 50, namely, the right-left direction, being connected to each of the pair of side pillars 11, 11 to interconnect the pair of side pillars 11, 11 in the width direction of the cab 5. The first beam 12A is disposed along the lower edge of the front wall of the cab body 50. The second beam 12B is disposed along the upper edge of the front wall of the cab body 50. The third beam 12C is disposed to extend in the width direction of the cab body 50 across a longitudinally middle portion of the top wall of the cab body 50. The fourth beam 12D is disposed along the rear edge of the top wall of the cab body 50.

Each of the first beam 12A, the third beam 12C, and the fourth beam 12D is formed of a member having high strength, such as a steel pipe having a great thickness and a large transverse cross section, to reinforce the structure of the entire guard 10. On the other hand, the second beam 12B functions as not only a reinforcement of the structure of the guard 10 but also an actuator housing beam capable of housing a blade actuator 33 included in the wiper 30 while having a compact structure.

Figure 4:
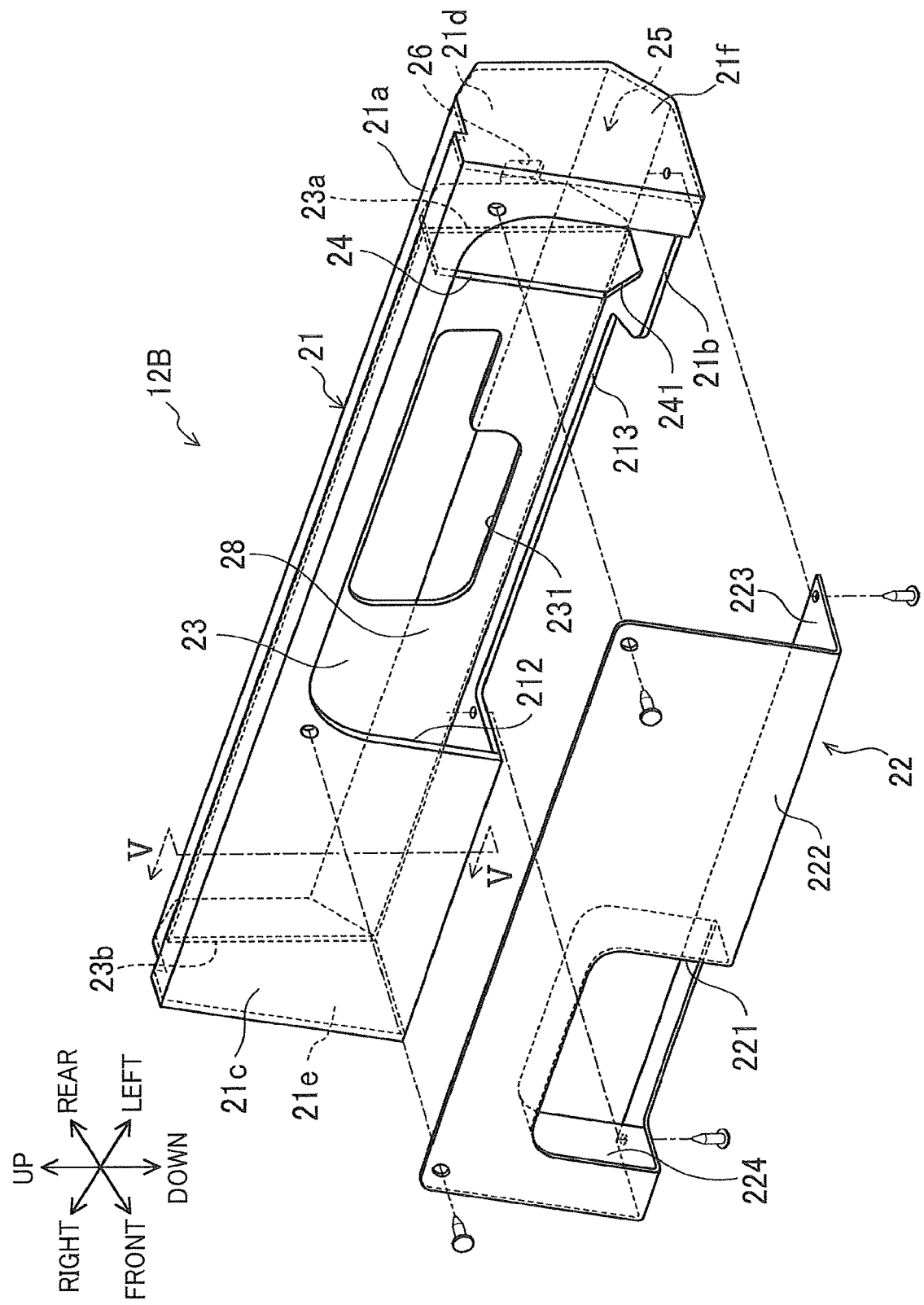
FIG. 4 is an exploded perspective view of a second beam serving as an actuator housing beam of the cab.

As shown in FIG. 4, the second beam 12B serving as the actuator housing beam has a greater cross section than that of each of the first beam 12A, the third beam 12C, and the fourth beam 12D. The second beam 12B includes a beam body 21 and a cover 22.

As shown in FIG. 4, the beam body 21 according to the present embodiment is a hollow structure composed of a plurality of plates and extending in the width direction of the cab 5. Each of the plurality of plates is made of, for example, a steel plate having a great thickness. The beam body 21 includes an upper wall portion 21a, a lower wall portion 21b, a front wall portion 21c, a rear wall portion 21d, a right-end wall portion 21e, and a left-end wall portion 21f, which wall portions form a closed cross-sectional structure.

The upper wall portion 21a and the lower wall portion 21b have respective strip-plate shapes extending in the width direction of the cab 5, being vertically spaced while extending substantially in parallel to each other. The lower wall portion 21*b* has a greater width in the front-rear direction than that of the upper wall portion 21*a*, and the front edge of the lower wall portion 21*b* is located slightly forward of the front edge of the upper wall portion 21*a*. The rear wall portion 21*d* has a long-plate shape with a substantially trapezoidal transverse cross section, being joined with respective rear edges of the upper wall portion 21*a* and the lower wall portion 21*b* to be integral with the upper and lower wall portions 21*a*, 21*b*. As shown in FIG. 5, the rear wall portion 21*d* includes an upper portion and a lower portion, each of which is an inclination portion 211 inclined so as to be displaced upward and downward as it goes forward, respectively.

The front wall portion 21*c* has a strip-plate shape extending in the width direction of the cab 5, being joined with respective front edges of the upper wall portion 21*a* and the lower wall portion 21*b*. The front wall portion 21*c* is inclined to a vertical plane at a small inclination angle so as to be gradually displaced forward as it goes downward. The right-end wall portion 21*e* and the left-end wall portion 21*f* are formed of respective polygonal plates, for example, a steel plate, joined with respective right and left edges of the upper wall portion 21*a*, the lower wall portion 21*b*, and the rear wall portion 21*d*, respectively. The right and left wall portions 21*e*, 21*f*, thus, are disposed to close opposite openings defined by the wall portions 21*a*, 21*b*, 21*c*, and 21*d* at the right and left ends of the beam body 21.

The front wall portion 21*c* and the lower wall portion 21*b* are formed with a front opening 212 and a lower opening 213, respectively. The front opening 212 and the lower opening 213 constitute a body opening that provides communication between the inside and the outside of the beam body 21. The front opening 212 has a rectangular shape extending from a substantially central portion of the front wall portion 21*c* longitudinally of the front wall portion 21*c*, i.e. with respect to the width direction of the cab 5, to the left end (to the right end in FIG. 4) of the front wall portion 21*c*. The front opening 212 is a notch extending upward from the lower edge line of the front wall portion 21*c*. The lower opening 213 has a rectangular shape extending leftward (rightward in FIG. 4) from a substantially central portion of the lower wall portion 21*b* longitudinally of the lower wall portion 21*b*, i.e. with respect to the width direction of the cab 5. The lower opening 213 is a notch extending rearward from the front edge line of the lower wall portion 21*b*.

The front opening 212 and the lower opening 213 are continued with each other so as to cross over the front wall portion 21*c* and the lower wall portion 21*b*. The right edge (the left edge in FIG. 4) of the front opening 212 and the right edge of the lower opening 213 are located at the same position with respect to the width direction of the cab 5. The lower opening 213 is shorter than the front opening 212 in the width direction of the cab 5. The left edge (the right edge in FIG. 4) of the lower opening 213 is therefore located closer to the widthwise center of the cab 5 than the left edge of the front opening 212. The front opening 212 and the lower opening 213 have respective shapes and sizes to allow the blade actuator 33 included in the wiper 30 to be attached to and detached from the inside of the second beam 12B through the openings 212, 213.

The second beam 12B further includes a front-rear partition plate 23 and a right-left partition plate 24.

The front-rear partition plate 23 has a strip-plate shape extending in the right-left direction, i.e. with respect to the width direction of the cab 5, being made of, for example, a steel plate. The front-rear partition plate 23 is disposed so as to partition a beam interior space, which is the internal space of the beam body 21, into front and rear sections. The front-rear partition plate 23 has a first end 23*a* adjacent to the left-end wall portion 21*f* constituting one end of the beam body 21, and a second end 23*b* opposite to the first end 23*a*, extending in the width direction of the cab 5 from the first end 23*a* to the second end 23*b*. In the present embodiment, the second end 23*b* is joined to or disposed in proximity to the right-end wall portion 21*e* constituting the other end of the beam body 21. In the present embodiment, the front-rear partition plate 23 has an upper edge joined (for example, by welding) to the inner surface of the upper wall portion 21*a*, a right edge joined to the inner surface of the right-end wall portion 21*e*, a lower edge joined to the inner surface of the lower wall portion 21*b*, and a left edge spaced inward of the second beam 12B from the inner surface of the left-end wall portion 21*f*.

The front-rear partition plate 23 is formed with a partition opening 231. The partition opening 231 penetrates a portion of the front-rear partition plate 23, the portion facing the front opening 212 and the lower opening 213 in the front-rear direction. The partition opening 231 according to the present embodiment is a horizontally long hole formed in a central portion of the front-rear partition plate 23. The partition opening 231 has a shape and size to allow a drive transmission mechanism 333 included in the blade actuator 33 to pass through the partition opening 231.

The right-left partition plate 24 is formed of a plate material, for example, a steel plate, having substantially the same shape as the right-end and left-end wall portions 21*e*, 21*f*. The right-left partition plate 24 is disposed so as to partition the beam interior space into right and left sections while intersecting the front-rear partition plate 23. The right-left partition plate 24 according to the present embodiment is disposed so as to intersect the first end 23*a* of the front-rear partition plate 23 at right angles at a position adjacent to the left-end wall portion 21*f*. Specifically, the right-left partition plate 24 partitions the beam interior space into an end space 25 and an actuator housing space 28. The end space 25 is a small space between the left-end wall portion 21*f* constituting the left end of the beam body 21 and the first end 23*a*. The actuator housing space 28 is a large space opposite to (on the right side of) the end space 25. The rear wall portion 21*d* is formed with a through-hole 26 for wiring, the through-hole 26 having communication with the end space 25.

The right-left partition plate 24 has an upper edge, a lower edge, a rear edge, and a front edge that are joined with respective inner surfaces of the upper wall portion 21*a*, the lower wall portion 21*b*, the rear wall portion 21*d*, and the front wall portion 21*c*, respectively. The right-left partition plate 24 has a right surface, to which the left end edge of the front-rear partition plate 23 is joined. The front edge of the right-left partition plate 24 can be exposed to the outside of the beam body 21 through the front opening 212. The front edge of the right-left partition plate 24 has a lower end, which is formed with a notch 241 for defining an insertion opening for wiring. The insertion opening provides communication between the actuator housing space 28 and the end space 25, thereby allowing the wiring to be installed in the right-left direction through the insertion opening.

As shown in FIG. 4, the cover 22 is attachable to the beam body 21 so as to cover the front opening 212 and the lower opening 213. Specifically, the cover 22 has a shape one size larger than the front and lower openings 212, 213. The cover 22 has a front wall portion 222 capable of covering the front opening 212 and a lower wall portion 223 extending rearward from the lower end of the front wall portion 222 to be capable of covering the lower opening 213. The cover 22 is made of, for example, a pressed steel plate having a cross section substantially in the shape of L. The cover 22 can be detachably fixed to the beam body 21 to close the front opening 212 and the lower opening 213 through, for example, fastening screws.

The cover 22 is formed with an arm opening 221 which serves as a cover opening. The arm opening 221 has a shape crossing over the front wall portion 222 and the lower wall portion 223, that is, a shape including a first portion passing through the front wall portion 222 and a second portion passing through the lower wall portion 223 and continued with the first portion. The arm opening 221 is located at a substantially longitudinally (with respect to the width direction of the cab 5) center of the beam body 21 in the state where the cover 22 is attached to the beam body 21. The arm opening 221 has a size large enough to allow a pair of link arms 32, 32 included in the wiper 30 to swing within a predetermined range, that is, enough to prevent the cover 22 from coming into contact with the pair of thus swinging link arms 32, 32.

The cover 22 further includes an inner wall 224 enclosing the arm opening 221. The inner wall 224 has a shape along the peripheral edge of the arm opening 221 when seen from the front, namely, an inverse U-shape in the example shown in FIG. 5, and protrudes rearward, i.e. inward of the second beam 12B, from the peripheral edge. Specifically, the inner wall 224 includes a front edge portion joined with the inner surface of the front wall portion 222 while extending along the peripheral edge of the portion of the arm opening 221 laid in the front wall portion 222, and a lower edge portion joined with the inner surface of the lower wall portion 223 while extending along the edge of the portion of the arm opening 221 laid in the lower wall portion 223.

Thus having a closed cross-sectional structure, the beam body 21 of the second beam 12B as the actuator housing beam is allowed to have high strength. Although the openings including the front opening 212 that are formed in the second beam 12B for the attachment of the parallel wiper 30 into the second beam 12B reduce the strength of the second beam 12B, the front-rear partition plate 23 and the right-left partition plate 24 partitioning the beam interior space into the plurality of spaces to divide the closed cross-sectional structure into a plurality of closed cross-sectional structures enable the second beam 12B to have sufficient strength despite the presence of the openings including the front opening 212.

Besides, the upper inclination portion 211 of the rear wall portion 21d of the second beam 12B, being inclined along a visual line of the operator looking diagonally upward, enables an excellent field of view for work in the visual line direction to be secured.

Furthermore, the second beam 12B and the wiper 30 are configured to enable the wiper 30 to be efficiently attached to the second beam 12B by utilization of the front-rear partition plate 23, as described in detail below.

As shown in FIG. 3, the wiper 30, a so-called parallel wiper, includes a blade 31, the pair of link arms 32, 32, a link member 34, and the blade actuator 33.

The pair of link arms 32, 32 have respective rod shapes extending in an arm longitudinal direction and extending in parallel to each other from the blade actuator 33 in the arm longitudinal direction. Each of the pair of link arms 32, 32 has a proximal end (an upper end in the present embodiment) connected to the blade actuator 33 and a distal end (a lower end in the present embodiment) opposite to the proximal end.

The link member 34 is connected to the respective distal ends of the pair of link arms 32, 32 so as to be rotationally movable and so as to horizontally interconnect the respective distal ends, thereby constituting a parallel link mechanism in cooperation with the pair of link arms 32, 32 and the blade actuator 33. The parallel link mechanism enables the link member 34 to make parallel movement, involved by respective rotational movements of the pair of link arms 32, 32 about their respective proximal ends, in the right-left direction (in the width direction of the cab 5) along a course corresponding to the swinging motion of the pair of link arms 32, 32 while maintaining the horizontal posture thereof (the posture where the link member 34 extends in the width direction of the cab 5).

The blade 31, a member to wipe water droplets on the outer surface of the front window member 52 while making parallel movement along the outer surface and making tight contact with the outer surface, is fixed to an appropriate portion (which is, in the present embodiment, the left end when seen from the operator's point of view, or the right end in FIG. 3) of the link member 34, in a posture vertically extending. In the present embodiment, the blade 31 is fixed to the link member 34 orthogonally thereto. The blade 31 includes a wiping part made of rubber extending longitudinally thereof (vertically), disposed so as to keep tight contact of the wiping part with the outer surface of the front window member 52.

The blade actuator 33 actuates the parallel link mechanism to reciprocate the blade 31 along the outer surface of the front window member 52, specifically, to cause the blade 31 to make parallel movement while maintaining the posture thereof extending vertically. The blade actuator 33 is housed in the space inside the second beam 12B, specifically, in the actuator housing space 28 located on the left side of the right-left partition plate 24. The blade actuator 33 includes, as shown in FIGS. 6A and 6B, a support base plate 331 corresponding to a support member, a blade drive motor 332, a drive transmission mechanism 333, and a pair of drive shafts 334, 334.

Figure 7:
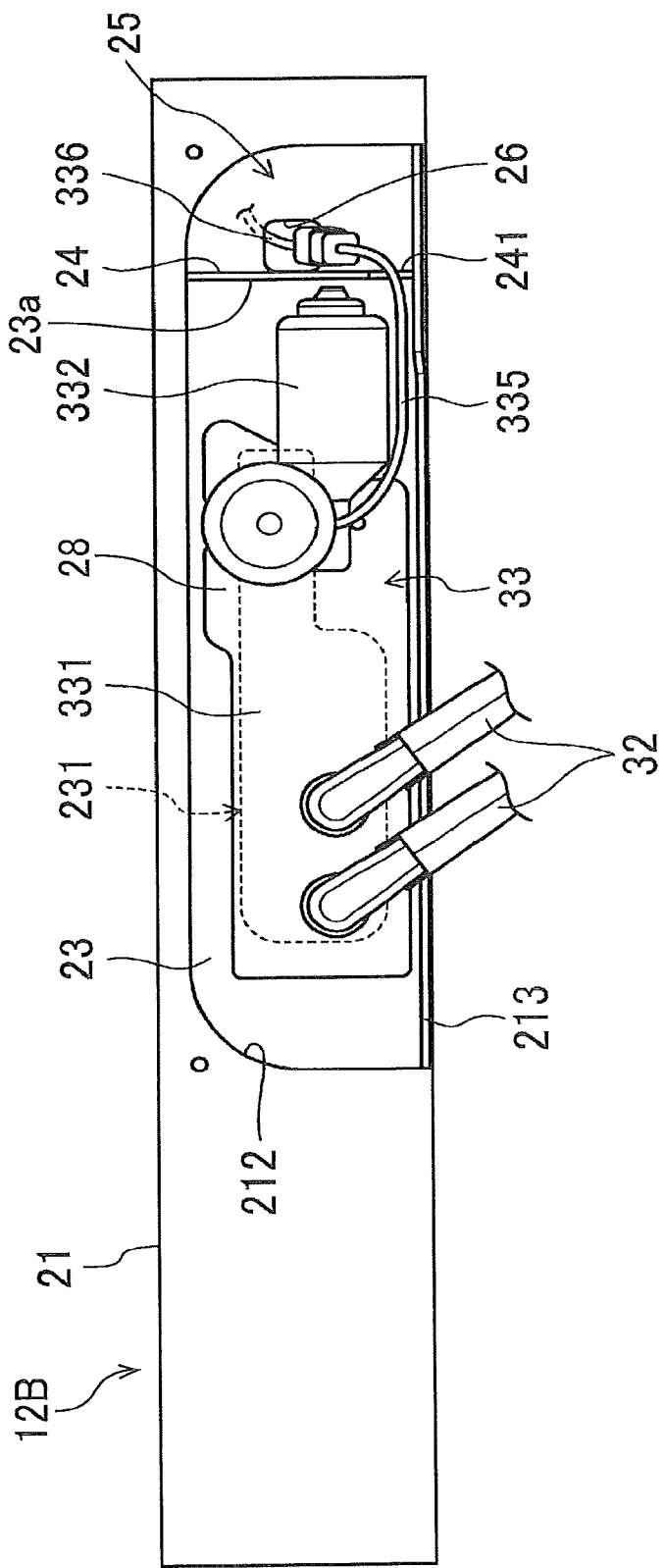
FIG. 7 is a front view of a beam body of the second beam and a blade actuator assembled to the beam body.
Figure 8:
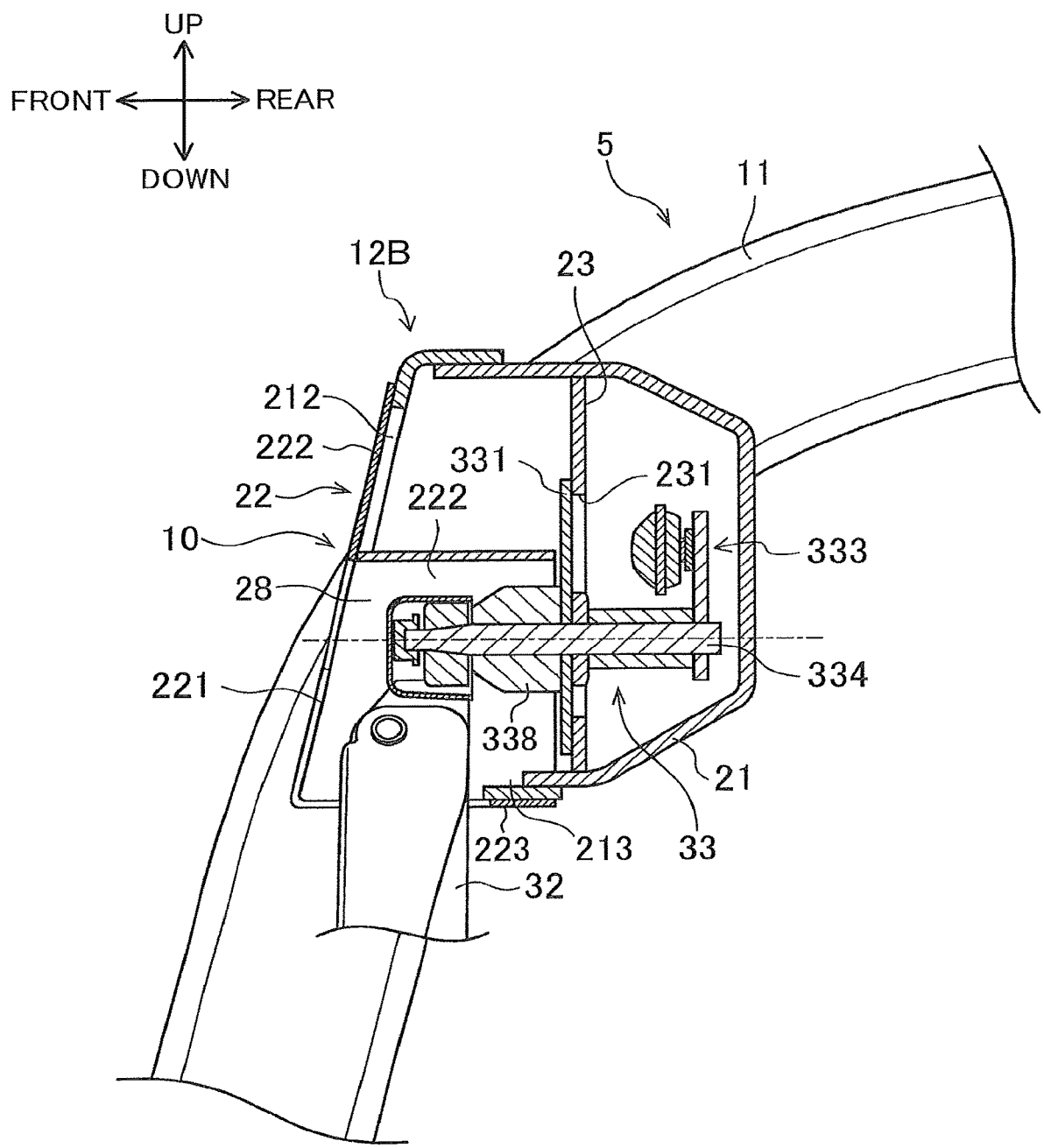
FIG. 8 is a sectional side view taken along the arrows VIII-VIII in FIG. 3.

The support base plate 331 supports the blade drive motor 332 and the pair of drive shafts 334, 334 while being fixed to the front-rear partition plate 23 of the second beam 12B. The support base plate 331 according to the present embodiment can be fixed, as shown in FIGS. 7 and 8, to the front surface of the front-rear partition plate 23 to close the partition opening 231 of the front-rear partition plate 23.

Figure 6A:
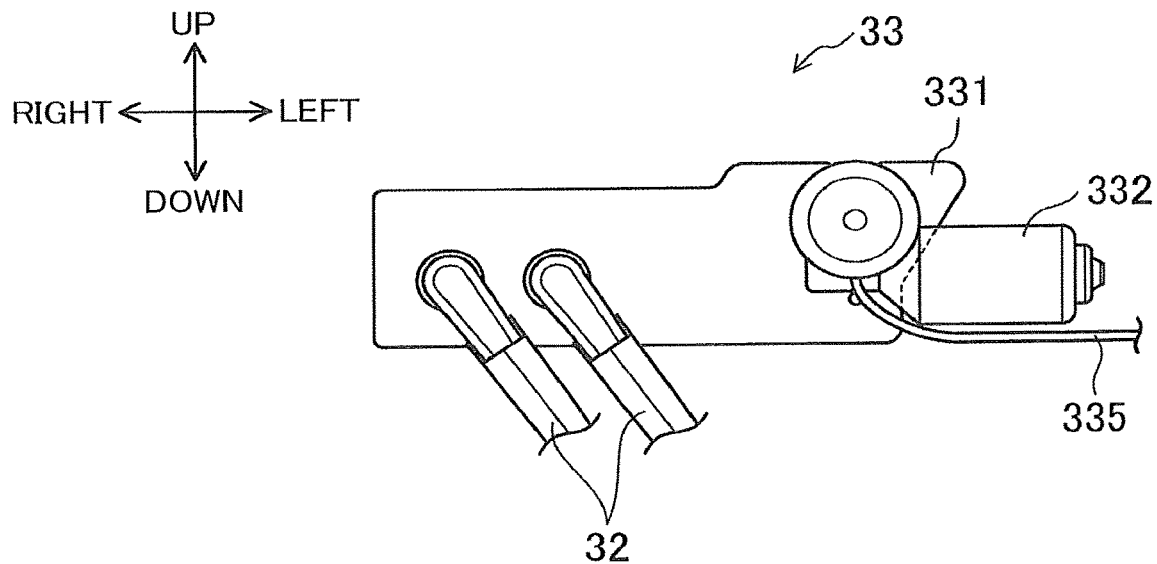
FIG. 6A is a front view of a blade actuator of the cab.
Figure 6B:
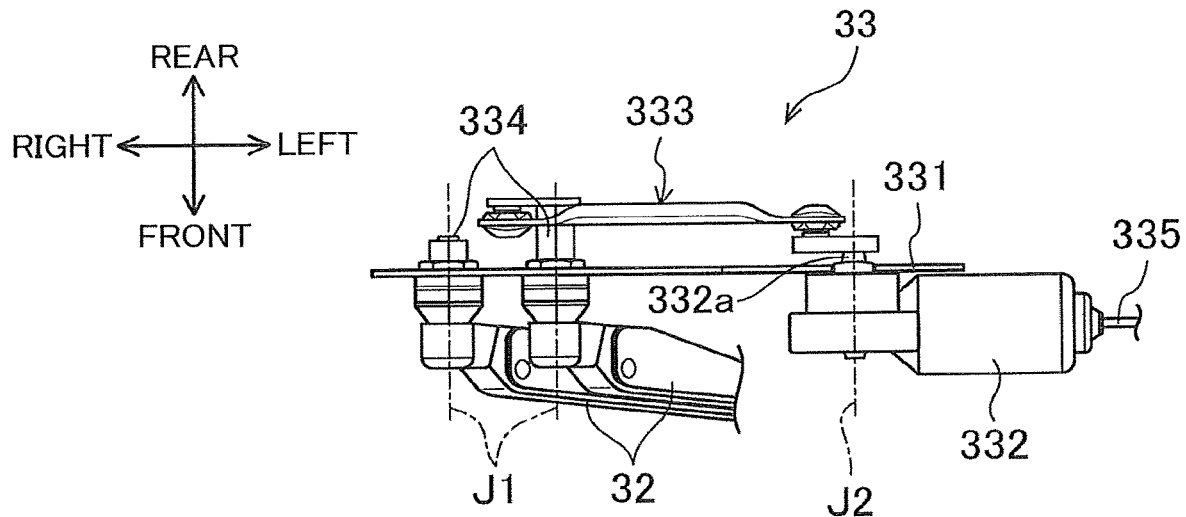
FIG. 6B is a plan view of the blade actuator.

The pair of drive shafts 334, 334 are spaced in the width direction of the cab 5 at respective positions close to the center of the front window member 52 with respect to the width direction of the cab 5 as shown in FIG. 3, i.e. at respective positions at the right end of the support base plate 331 when seen from the operator's point of view as shown in FIGS. 6A and 6B. The pair of drive shafts 334, 334 penetrate the support base plate 331 in the front-rear direction, pivoted on the support base plate 331 through respective bearings 338 rotatably about axes J1, J1 passing through the respective proximal ends of the pair of link arms 32, 32 in the front-rear direction. The pair of drive shafts 334, 334 have respective front ends, to which respective proximal ends of the pair of link arms 32, 32 are connected so as to be integrally rotated therewith, respectively. The pair of drive shafts 334, 334 and the support base plate 331, thus, constitute a link arm support unit that supports the pair of link arms 32, 32 so as to allow the pair of link arms 32, 32 to swing about the pair of drive shafts 334, 334 connected to their respective proximal ends, respectively.

The blade drive motor 332 is fixed to the front surface of the support base plate 331 apart from the pair of drive shafts 334, 334 in the width direction of the cab 5 (in the present embodiment, leftward when seen from the operator's point of view). The blade drive motor 332 has an output shaft 332a shown in FIG. 6B. The output shaft 332a protrudes rearward beyond the support base plate 331 while penetrating the support base plate 331 in the front-rear direction and pivoted on the support base plate 331 through a bearing rotatably about an axis J2 parallel to the axes J1, J1.

The drive transmission mechanism 333 interconnects the portion of the output shaft 332a that protrudes beyond the support base plate 331 and the rear end of one of the pair of drive shafts 334, 334 (in FIG. 6B, the left drive shaft 334 when seen from the operator's point of view, which is located closer to the output shaft 332a). The drive transmission mechanism 333, which is, for example, formed of a link mechanism, transmits the power generated by the blade drive motor 332 to the pair of drive shafts 334, 334 so as to convert the rotation of the output shaft 332a into swinging motion, i.e. periodical and rotational movement in forward and reverse directions, of the drive shafts 334, 334 and further the pair of link arms 32, 32 connected to the drive shafts 334, 334, thereby swinging the pair of link arms 32, 32 to right and left. In short, the drive transmission mechanism 333 actuates the parallel link mechanism to reciprocate the blade 31.

As shown in FIG. 7, the blade actuator 33 has an overall shape one size smaller than the front opening 212 when seen from the front, thus allowed to be inserted into the second beam 12B from the front side of the second beam 12B through the front opening 212 and the lower opening 213. The thus inserted blade actuator 33 further can be assembled to the front-rear partition plate 23, that is, housed in the second beam 12B, by fixing the support base plate 331 of the blade actuator 33 to the front surface of the front-rear partition plate 23 through, for example, fastening screws. This enables the blade actuator 33 to be effectively protected by utilization of the second beam 12B.

The partition opening 231 of the front-rear partition plate 23 allows the drive transmission mechanism 333 located rearward of the support base plate 331 to pass through the partition opening 231 from the front to the rear of the front-rear partition plate 23, thereby allowing the drive transmission mechanism 333 to be disposed rearward of the front-rear partition plate 23 while the support base plate 331 is fixed to the front surface of the front-rear partition plate 23 as shown in FIG. 8. This reduces the size of each of the forward protruding portions of the pair of drive shafts 334, 334 beyond the support base plate 331, thereby enabling the second beam 12B to house the blade actuator 33 and the proximal ends (upper ends) of the pair of link arms 32, 32 connected to the pair of drive shafts 334, 334 with no significant increase in the dimension of the second beam 12B in the front-rear direction. In particular, the partition opening 231 according to the present embodiment, having a shape that allows not only the drive transmission mechanism 333 but also the pair of drive shafts 334, 334 and the output shaft 332a of the blade drive motor 332 to pass through the partition opening 231 in the front-rear direction, enables the drive transmission mechanism 333 to interconnect the one of the pair of drive shafts 334, 334 and the output shaft 332a at the position rearward of the front-rear partition plate 23 while the support base plate 331 is fixed to the front surface of the front-rear partition plate 23.

The lower opening 213 allows the pair of link arms 32, 32 to extend from the blade actuator 33 to the position downward of the second beam 12B through the lower opening 213, thereby allowing, as shown in FIG. 8, the pair of link arms 32, 32 and the blade 31 supported by the pair of link arms 32, 32 to be located rearward of the front surfaces of the pair of side pillars 11, 11, that is, inward of the front surfaces in the front-rear direction. This enables the pair of side pillars 11, 11 to effectively protect not only the cab body 50 but also the wiper 30. Besides, such arrangement of the wiper 30 inside the guard 10 allows the entire cab 5 to have reduces size and prevents the appearance of the cab 5 from being deteriorated. Furthermore, the arrangement allows the pair of link arms 32, 32 to be located near the outer surface of the front window member 52, thereby eliminating the necessity for the pair of link arms 32, 32 to incline greatly with respect to the front window member 52.

As shown in FIG. 7, a cable 335 connected to the blade drive motor 332 can be led into the end space 25 formed on the left side of the beam body 21 through the insertion opening defined by the notch 241 formed in the right-left partition plate 24, despite the presence of the right-left partition plate 24. The cable 335 thus led into the end space 25 can be connected to an external cable 336 for power supply via a connector in the end space 25, the external cable 336 being led into the end space 25 from the outside of the beam body 21 through the through-hole 26 formed in the rear wall portion 21d as shown in, for example, FIGS. 4 and 7.

After such assembling of the blade actuator 33 into the beam body 21 of the second beam 12B in the above-described manner, the cover 22 is attached to the beam body 21. The thus attached cover 22 closes the front opening 212 and the lower opening 213 as shown in FIG. 3, whereas the arm opening 221 of the cover 22 allows, in cooperation with the lower opening 213, the pair of link arms 32, 32 to extend downward from the pair of drive shafts 334, 334 to the outside of the cover 22 through the arm opening 221 and the lower opening 213, respectively, and further to swing within the arm opening 221 and the lower opening 213. The inner wall 224 of the cover 22, which encloses the arm opening 221 allowing the pair of link arms 32, 32 to be inserted thereinto, prevents rainwater or dust from entering the inside of the second beam 12B through the arm opening 221.

The cover 22 is attached to the beam body 21 to substantially seal the end space 25, thereby restraining rainwater having intruded into the end space 25 through the through-hole 26 from wetting the blade actuator 33. The second beam 12B is thus given excellent waterproof property.

The above-described cab 5 of the hydraulic excavator 1 allows the wiper 30 to be supported efficiently and effectively by utilization of the large-sized guard 10 conforming to the ROPS standards. The cab 5 is thus achieved capable of effectively protecting the cab body 50 and securing an excellent field of view for work while having a compact structure.

The cab for a construction machine according to the disclosed technique is not limited to the above-described embodiment, but may be configured in various other ways.

For example, the cab according to the disclosed technique is not limited to the hydraulic excavator shown in FIG. 1. For example, the cab can be applied to a construction machine for recycle. The front-rear partition plate 23 according to the above-described embodiment may be inclinedly disposed in the beam body 21. The specific cross section of the beam body 21 is not limited to a particular shape, permitted to be varied according to the specifications, such as a polygon or circle. The second beam 12B does not have to be directly joined to the pair of side pillars 11, 11 as shown in FIG. 2; it may be joined to each of the pair of side pillars 11, 11, for example, through an attachment member. This can prevent the second beam 12B from protruding outward beyond the pair of side pillars 11, 11.

Although the cab according to the disclosed technique preferably conforms to the ROPS standards, it is not essential. Although it is preferable for the guard to include a plurality of beams to have high strength, the guard according to the disclosed technique only has to include at least the actuator housing beam.

As described above, a cab for a construction machine is provided, being capable of effectively protecting a cab body and securing an excellent field of view for work with a compact structure. The cab comprises: a cab body defining an operator's compartment and including a front window member facing forward; a guard for protecting the cab body; and a wiper configured to wipe off water droplets on an outer surface of the front window member. The wiper includes a pair of link arms having respective proximal ends, a blade supported by the pair of link arms so as to make tight contact with an outer surface of the front window member, and a blade actuator configured to swing the pair of link arms about axes passing through the respective proximal ends of the pair of link arms in a front-rear direction to thereby reciprocate the blade along the outer surface of the front window member. The blade actuator includes a link arm support unit that supports the respective proximal ends of the pair of link arms so as to allow the pair of link arms to swing, a blade drive motor for generating power, and a drive transmission mechanism configured to transmit the power generated by the blade drive motor to the pair of link arms to swing the pair of link arms. The guard includes a pair of side pillars extending along opposite edges of the cab body in a width direction of the cab body, respectively, and at least one beam disposed between the pair of side pillars to interconnect the pair of side pillars in the width direction. The at least one beam includes an actuator housing beam that houses the blade actuator. The actuator housing beam includes a hollow beam body extending in the width direction along an upper front portion of the cab body, and a front-rear partition plate partitioning a beam interior space, which is an internal space of the beam body, into front and rear sections. The beam body is formed with a body opening that provides communication between an inside and an outside of the beam body, the body opening allowing the blade actuator to be assembled to the front-rear partition plate through the body opening and allowing the pair of link arms to extend from the blade actuator to the outside of the actuator housing beam through the body opening to support the blade.

The thus configured cab, while including the guard and the wiper, is able to have a compact structure and to secure an excellent field of view for work by utilization of the guard.

The front-rear partition plate of the cab enables the actuator housing beam to have a high strength closed cross-sectional structure, despite the hollow structure thereof for housing the blade actuator. Although the beam body of the actuator housing beam is formed with the body opening for allowing the blade actuator to be assembled into the actuator housing beam, the front-rear partition plate, which partitions the beam interior space of the actuator housing beam into the front and rear sections, enables the actuator housing beam to have strength enough to protect the cab body despite the presence of the body opening.

The body opening allows the blade actuator to be efficiently and easily assembled into the beam body through the body opening. The actuator housing beam, housing the blade actuator, can effectively protect the blade actuator while allowing the entire cab to be compact and without deterioration of the appearance thereof.

It is preferable that the front-rear partition plate is formed with a partition opening in an area facing the body opening, the partition opening penetrating the front-rear partition plate in the front-rear direction and allowing the drive transmission mechanism to pass through the partition opening from front to rear of the front-rear partition plate, and the drive transmission mechanism is disposed rearward of the front-rear partition plate to which the blade actuator is assembled. This reduces the size of protrusion portion of each of the proximal ends of the pair of link arms located in front of the drive transmission mechanism, the protrusion portion protruding forward beyond the front-rear partition plate, to thereby allow the proximal ends to be housed in the actuator housing beam. Besides, the pair of link arms are allowed to be located near the outer surface of the front window member, having no necessity of large inclination to the outer surface of the front window member.

More specifically, it is preferable that: the link arm support unit includes a pair of drive shafts extending in the front-rear direction and having respective front ends to which respective proximal ends of the pair of link arms are connected, respectively, and a support member supporting the pair of drive shafts so as to allow the pair of drive shafts to rotate about respective axes passing through the drive shaft in the front-rear direction; the pair of drive shafts penetrate the support member in the front-rear direction; the partition opening allows the pair of drive shafts and an output shaft of the blade drive motor to pass through the partition opening in the front-rear direction; and the drive transmission mechanism is located rearward of the support member and disposed so as to interconnect the pair of drive shafts and the output shaft at the position rearward of the front-rear partition plate that has a front face to which the support member is fixed. This enables the drive transmission mechanism to interconnect one of the pair of drive shafts and the output shaft of the blade drive motor at the position rearward of the front-rear partition plate while the support member is fixed to the front surface of the front-rear partition plate, thereby allowing the actuator housing beam to have further reduced size.

It is preferable that the actuator housing beam further includes a cover to be attached to the beam body to close the body opening, the cover being formed with a cover opening that has a shape allowing the pair of link arms to extend from the blade actuator to an outside of the cover through the cover opening and the body opening and allowing the pair of link arms to swing.

The cover, while closing the body opening of the beam body, can allow the pair of link arms to extend from the blade actuator housed in the beam body to the outside of the cover through the cover opening.

More preferably, the cover in this mode further includes an inner wall extending rearward from a peripheral edge of the cover opening to enclose the cover opening. The inner wall can restrain rainwater or dust from entering the inside of the actuator housing beam through the cover opening.

The pair of link arms can be disposed, for example, so as to extend downward from the beam body. The thus disposed pair of link arms can be located inside the pair of side pillars together with the blade, which allows the side pillars to protect not only the cab body but also the wiper.

It is preferable that the actuator housing beam further includes a right-left partition plate intersecting the front-rear partition plate in the beam body and partitioning the beam interior space into right and left sections. The right-left partition plate can divide the beam interior space into many spaces, in cooperation with the front-rear partition plate, to thereby allow the actuator housing beam to have higher strength.

In this mode, it is preferable that: the front-rear partition plate has a first end adjacent to one end of the beam body in the width direction and a second end opposite to the first end and extends in the width direction from the first end to the second end; the right-left partition plate is disposed so as to intersect the first end of the front-rear partition plate to partition the beam interior space into an end space defined between the first end and the one end of the beam body and an actuator housing space in which the blade actuator is housed, the partition plate having a shape defining an insertion opening that provides communication between the end space and the actuator housing space; and the insertion opening allows a cable connected to the blade drive motor disposed in the actuator housing space to be led into the end space through the insertion opening and connected to an external cable led from the outside of the beam body in the end space. The right-left partition plate prevents rainwater having intruded into the beam body, for example, through a through-hole formed in the beam body to lead the external cable thereinto, from wetting the blade actuator in the actuator housing space, thereby allowing the actuator housing beam to have excellent waterproof property.

It is preferable that the wiper further includes a link member that interconnects respective distal ends opposite to the proximal ends of the pair of link arms to constitute a parallel link mechanism in cooperation with the pair of link arms and the blade actuator, and the blade is fixed to the link member. The link member thus constituting the parallel link mechanism enables the blade fixed to the link member to make parallel movement with a constant posture thereof.

This application is based on Japanese Patent application No. 2019-175799 filed in Japan Patent Office on Sep. 26, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A cab for a construction machine, comprising:
a cab body defining an operator's compartment and including a front window member facing forward;
a guard for protecting the cab body; and
a wiper configured to wipe off water droplets on an outer surface of the front window member, wherein:
the wiper includes a pair of link arms having respective proximal ends, a blade supported by the pair of link arms so as to make tight contact with an outer surface of the front window member, and a blade actuator configured to swing the pair of link arms about axes passing through the respective proximal ends of the pair of link arms in a front-rear direction to thereby reciprocate the blade along the outer surface of the front window member;
the blade actuator includes a link arm support unit that supports the respective proximal ends of the pair of link arms so as to allow the pair of link arms to swing, a blade drive motor for generating power, and a drive transmission mechanism configured to transmit the power generated by the blade drive motor to the pair of link arms to swing the pair of link arms;
the guard includes a pair of side pillars extending along opposite edges of the cab body in a width direction of the cab body, respectively, and at least one beam disposed between the pair of side pillars to interconnect the pair of side pillars in the width direction;
the at least one beam includes an actuator housing beam that houses the blade actuator, the actuator housing beam including a hollow beam body extending in the width direction along an upper front portion of the cab body, and a front-rear partition plate partitioning a beam interior space, which is an internal space of the beam body, into front and rear sections; and
the beam body is formed with a body opening that provides communication between an inside and an outside of the beam body, the body opening allowing the blade actuator to be assembled to the front-rear partition plate through the body opening and allowing the pair of link arms to extend from the blade actuator to an outside of the actuator housing beam through the body opening to support the blade.

2. The cab according to claim 1, wherein the front-rear partition plate is formed with a partition opening in an area facing the body opening, the partition opening penetrating the front-rear partition plate in the front-rear direction and allowing the drive transmission mechanism to pass through the partition opening from front to rear of the front-rear partition plate, and the drive transmission mechanism is disposed rearward of the front-rear partition plate to which the blade actuator is assembled.

3. The cab according to claim 2, wherein: the link arm support unit includes a pair of drive shafts extending in the front-rear direction and having respective front ends to which respective proximal ends of the pair of link arms are connected, respectively, and a support member supporting the pair of drive shafts so as to allow the pair of drive shafts to rotate about respective axes passing through the drive shaft in the front-rear direction; the pair of drive shafts penetrate the support member in the front-rear direction; the partition opening allows the pair of drive shafts and an output shaft of the blade drive motor to pass through the partition opening in the front-rear direction; and the drive transmission mechanism is located rearward of the support member and disposed so as to interconnect the pair of drive shafts and the output shaft at the position rearward of the front-rear partition plate that has a front face to which the support member is fixed.

4. The cab according to claim 1, wherein the actuator housing beam further includes a cover to be attached to the beam body to close the body opening, the cover being formed with a cover opening that has a shape allowing the pair of link arms to extend from the blade actuator to an outside of the cover through the cover opening and the body opening and allowing the pair of link arms to swing.

5. The cab according to claim 4, wherein the cover further includes an inner wall extending rearward from a peripheral edge of the cover opening to enclose the cover opening.

6. The cab according to claim 1, wherein the pair of link arms are disposed to extend downward from the beam body.

7. The cab according to claim 1, wherein the actuator housing beam further includes a right-left partition plate intersecting the front-rear partition plate in the beam body to partition the beam interior space into right and left sections.

8. The cab according to claim 7, wherein: the front-rear partition plate has a first end adjacent to one end of the beam body in the width direction and a second end opposite to the first end and extends in the width direction from the first end to the second end; the right-left partition plate is disposed so as to intersect the first end of the front-rear partition plate to partition the beam interior space into an end space defined between the first end and the one end of the beam body and an actuator housing space in which the blade actuator is housed, the right-left partition plate having a shape defining an insertion opening that provides communication between the end space and the actuator housing space; and the insertion opening allows a cable connected to the blade drive motor disposed in the actuator housing space to be led into the end space through the insertion opening and connected to an external cable led from the outside of the beam body in the end space.

9. The cab according to claim 1, wherein the wiper further includes a link member that interconnects respective distal ends opposite to the proximal ends of the pair of link arms to constitute a parallel link mechanism in cooperation with the pair of link arms and the blade actuator, and the blade is fixed to the link member.

\* \* \* \* \*